(12) United States Patent
Krehl et al.

(10) Patent No.: US 9,355,789 B2
(45) Date of Patent: May 31, 2016

(54) INTERNAL INSULATION DESIGN USING POROUS MATERIAL FOR AN ELECTROCHEMICAL CELL

(71) Applicant: Greatbatch Ltd., Clarence, NY (US)

(72) Inventors: Paul W. Krehl, Clarence Center, NY (US); Marcus J. Palazzo, Wheatfield, NY (US)

(73) Assignee: Greatbatch Ltd., Clarence, NY (US)

( * ) Notice: Subject to any disclaimer, the term of this patent is extended or adjusted under 35 U.S.C. 154(b) by 163 days.

(21) Appl. No.: 14/271,901

(22) Filed: May 7, 2014

(65) Prior Publication Data

US 2014/0335394 A1 Nov. 13, 2014

Related U.S. Application Data

(60) Provisional application No. 61/821,849, filed on May 10, 2013.

(51) Int. Cl.
*H01G 11/06* (2013.01)
*H01M 2/14* (2006.01)
*H01M 2/16* (2006.01)
*H01G 11/84* (2013.01)
*H01G 11/46* (2013.01)
*H01M 2/34* (2006.01)
(Continued)

(52) U.S. Cl.
CPC .............. *H01G 11/06* (2013.01); *H01G 11/46* (2013.01); *H01G 11/84* (2013.01); *H01M 2/1613* (2013.01); *H01M 2/34* (2013.01); *H01M 6/16* (2013.01); *H01M 2/22* (2013.01); *H01M 4/485* (2013.01); *H01M 4/54* (2013.01); *H01M 4/582* (2013.01); *H01M 4/5815* (2013.01); *H01M 10/058* (2013.01); *Y10T 29/417* (2015.01); *Y10T 29/49108* (2015.01)

(58) Field of Classification Search
CPC ..... H01M 2/1613; H01M 2/145; H01M 6/16; H01M 10/0431; H01M 2/065
See application file for complete search history.

(56) References Cited

U.S. PATENT DOCUMENTS 7,432,001 B1 * 10/2008 Takeuchi ............... H01M 2/266
429/161
7,611,805 B2 * 11/2009 Frustaci .................. H01M 2/22
29/623.5
2007/0059599 A1 3/2007 Rubino et al.
(Continued)

OTHER PUBLICATIONS

"EPSearch", EP Application 14167636.1, Sep. 5, 2014.

*Primary Examiner* — Stewart Fraser
(74) *Attorney, Agent, or Firm* — Michael F. Scalise

(57) ABSTRACT

The prevention of lithium clusters from bridging between the negative and positive portions of a cell during discharge is described. This is done by providing a glass wool material at an intermediate location between the casing and anode current collector of a negative polarity and the cathode current collector and the terminal pin being of a positive polarity. Typically, a lithium ion concentration gradient sufficient to cause lithium cluster formation is induced by the high rate, intermittent discharge of a lithium/silver vanadium oxide (Li/SVO) cell. However, sufficient free electrolyte necessary for normal cell function is held in the relatively large pore volume throughout the extent of the glass wool material. Moreover, permeability within the glass wool material is tortuous, which effectively increases the distance between the negative and positive surfaces of the anode and cathode. This tortuosity effectively stops "straight line" dendrite growth of lithium clusters between opposite polarity structures inside the casing.

18 Claims, 2 Drawing Sheets

(51) Int. Cl.
*H01M 6/16* (2006.01)
*H01M 2/22* (2006.01)
*H01M 4/485* (2010.01)
*H01M 4/54* (2006.01)
*H01M 4/58* (2010.01)
*H01M 10/058* (2010.01)

(56) References Cited

U.S. PATENT DOCUMENTS

2007/0281207 A1* 12/2007 Takeuchi ............... H01M 6/16
429/112
2008/0085451 A1 4/2008 Freitag et al.
2009/0061313 A1 3/2009 Tadano

* cited by examiner

INTERNAL INSULATION DESIGN USING POROUS MATERIAL FOR AN ELECTROCHEMICAL CELL

CROSS-REFERENCE TO RELATED APPLICATION

This application claims priority to U.S. Provisional Application No. 61/821,849, filed May 10, 2013.

BACKGROUND OF THE INVENTION

1. Field of the Invention

The present invention generally relates to the conversion of chemical energy to electrical energy. More particularly, this invention is directed to preventing lithium from bridging between the negative and positive portions of a cell during discharge, particularly high rate intermittent pulse discharge. Such lithium bridging is referred to as a "lithium cluster" and should it occur, an internal loading mechanism that prematurely discharges the cell could result.

2. Prior Art

The mechanism controlling lithium deposition between the negative and positive cell portions of a case negative primary lithium electrochemical cell, such as between the negative casing and the cathode lead, is described in the publication by Takeuchi, E. S.; Thiebolt, W. C., J. Electrochem. Soc. 138, L44-L45 (1991). While this report specifically discusses measurements made on the lithium/silver vanadium oxide (Li/SVO) system, it also applies to other solid insertion type cathodes used in lithium cells where voltage decreases with discharge.

It is known that lithium deposition is induced by a high rate intermittent pulse discharge of a Li/SVO cell. For a case-negative cell design, high rate pulse discharge can form "clusters" bridging from the negative case to the positive connections for the cathode. The opposite is true for a cell of a case-positive design. In any event, such a conductive bridge can then result in an internal loading mechanism that prematurely discharges the cell.

The mechanism for lithium cluster formation is as follows: at equilibrium, the potential of a lithium anode is governed by the concentration of lithium ions in the electrolyte according to the Nernst equation. If the $Li^+$ ion concentration is increased over a limited portion of the electrode surface, then the electrode/electrolyte interface in this region is polarized anodically with respect to the electrode/electrolyte interface over the remaining portion of the electrode. Lithium ions are reduced in this region of higher concentration and lithium metal is oxidized over the remaining portion of the electrode until the concentration gradient is relaxed. The concentration gradient is also relaxed by diffusion of lithium ions from the region of high concentration to a region of relatively lower concentration. However, as long as a concentration gradient exists, deposition of lithium is thermodynamically favored in the region of high lithium ion concentration.

In a Li/SVO cell, $Li^+$ ions are discharged at the anode and subsequently intercalated into the cathode. The anode and cathode are placed in close proximity across a thin separator. Immediately after a pulse discharge, the $Li^+$ ion concentration gradient in the separator is dissipated as the $Li^+$ ions diffuse the short distance from the anode to the cathode and than within the pore structure of the cathode. However, at the electrode assembly edge, the anode edge is not directly opposed by the cathode edge. If excess electrolyte pools at this edge, $Li^+$ ions, which are discharged into the electrolyte pool, have a longer distance to diffuse to the cathode than $Li^+$ ions discharged into the separator. Consequently, this electrolyte pool maintains a higher concentration of $Li^+$ ions for a longer period of time after the pulse discharge.

Typically, the lithium anode tab is welded to the inside of the casing. Therefore, if these components are also wetted by excess electrolyte, this concentration gradient extends over the tab and casing, and lithium cluster deposition is induced onto these surfaces by the Nernstian anodic potential shift derived from the higher $Li^+$ ion concentration in the excess electrolyte pool after the pulse discharge.

SUMMARY OF THE INVENTION

Accordingly, the present invention is directed to the prevention of lithium clusters from bridging between the negative and positive portions of a cell during discharge. Providing a loosely packed glass wool material above the anode/cathode stack assembly and below the casing lid or header helps prevent formation of lithium clusters in this area.

U.S. Pat. No. 3,861,963 to Afrance et al. describes placing a TEFLON® felt over the top of an electrode, for example a zinc electrode, and within a flexible separator envelope. The prior art felt, being a nonwoven fabric of TEFLON® fibers matted together by heat, moisture, and great pressure, aids in retaining electrolyte in the zinc electrode compartment.

However, the present glass wool material is much more loosely packed than a felt material. The glass wool must be able to provide a relatively large pore volume to be wetted with a sufficient amount of free electrolyte necessary for normal cell function. Additionally, glass wool material must be permeable enough to provide sufficiently tortuous paths that effectively increase the distance between the negative and positive surfaces of the respective current collector structures for the anode and cathode. This tortuosity effectively stops the "straight line" dendrite growth between opposite polarity structures inside the cell casing.

These and other aspects of the present invention will become more apparent to those skilled in the art by reference to the following description and to the appended drawings.

DETAILED DESCRIPTION OF THE PREFERRED EMBODIMENTS

A lithium cluster is the result of a higher $Li^+$ ion concentration in the electrolyte immediately adjacent to a surface creating an anodically polarized region resulting in the reduction of lithium ions on the surface as the concentration gradient relaxes. Typically, a lithium ion, concentration gradient is induced by the high rate, intermittent discharge of a cell of a lithium/solid cathode active chemistry, such as a lithium/silver vanadium oxide cell.

The term "pulse" means a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit, rest between the pulses. An exemplary pulse train may consist of one to four 5 to 20-second pulses with about a 2 to 30 second rest, preferably about 15 second rest, between each pulse. A typically used range of current densities for cells powering implantable medical devices is about 19 mA/cm$^2$ to about 50 mA/cm$^2$, and more preferably about 18 mA/cm$^2$ to about 35 mA/cm$^2$. Typically, a 10 second pulse is suitable for medical implantable applications. However, it could be significantly shorter or longer depending on the specific cell design and chemistry and the associated device energy requirements. Current densities are based on square centimeters of the cathode electrode.

The term "glass wool" is defined as very fine, soft, curly filaments, threads or thread-like structures of glass in a porous, random, and overlapping arrangement.

An electrochemical cell according to the present invention must have sufficient energy density and discharge capacity in order to be a suitable power source for an implantable medical device. Contemplated medical devices include implantable cardiac pacemakers, defibrillators, neurostimulators, drug pumps, ventricular assist devices, and the like.

Figure 1:
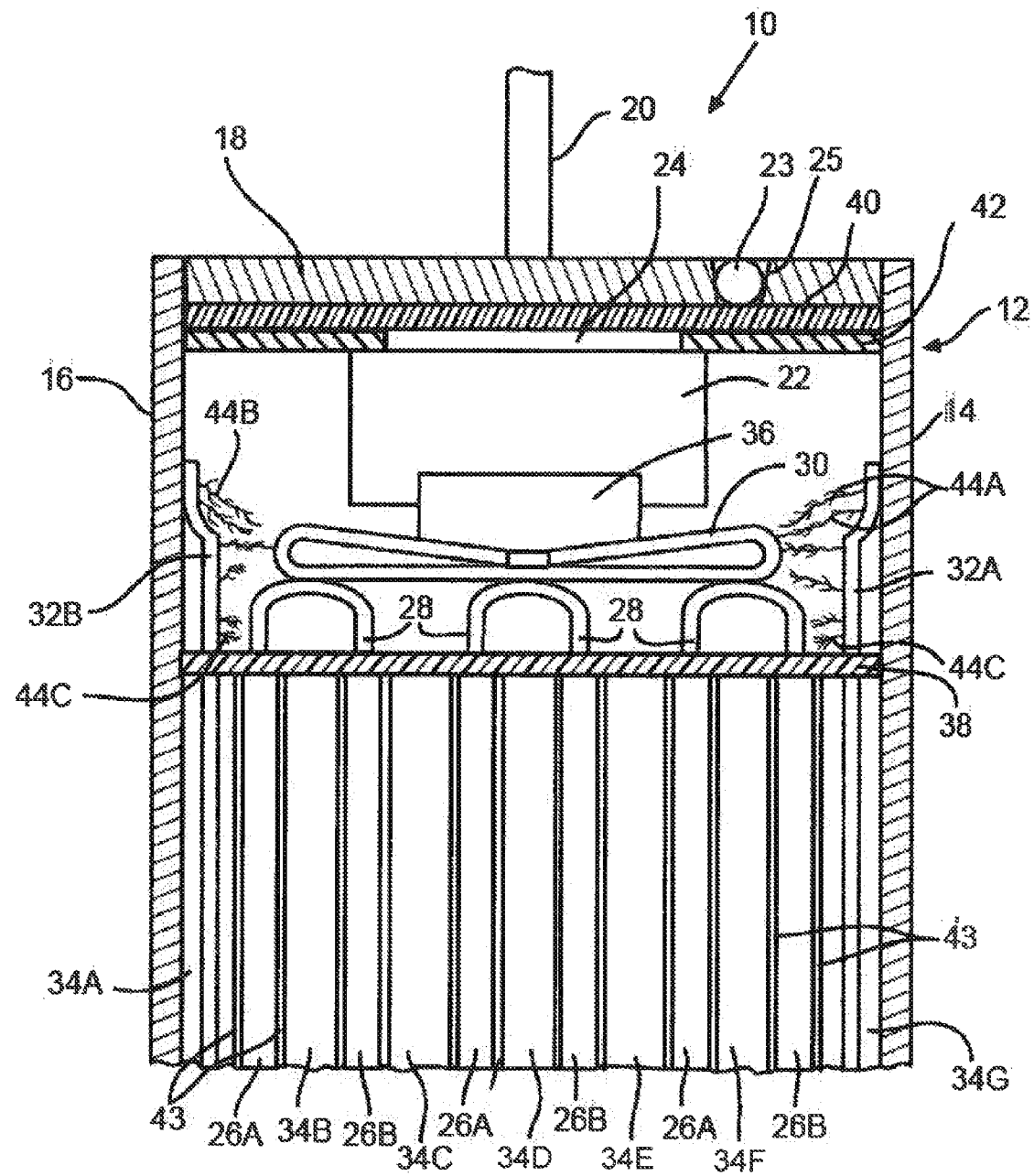
FIG. 1 is a partial sectional view of an exemplary electrochemical cell 10 according to the prior art.

Referring now to the drawings, FIG. 1 shows a conventional electrochemical cell 10 for delivering high current pulses and particularly suited as a power source for an implantable cardiac defibrillator. Cell 10 includes a hollow casing 12 having spaced apart sidewalls 14, 16 extending to spaced apart end walls (not shown) and a bottom wall (not shown), Casing 12 is closed at the top by a lid 18 welded to the sidewalls and end walls in a known manner. Casing 12 is of metal such as titanium or stainless steel, and being electrically conductive provides one terminal or contact for making electrical connection between the cell and its load. Lid 18 also is of titanium or stainless steel. The other electrical terminal or contact is provided by a conductor or pin 20 extending from within the cell 10 through casing 12, and in particular through lid 18. An insulator cup 22 of a polymeric material such as the thermoplastic fluoropolymers HALAR® or TEFZEL® surrounds and partially encases the ferrule 24 of a glass-to-metal seal structure. As is well known by those skilled in the art, the terminal pin 20 is electrically insulated from the metal lid 18 by the glass-to-metal seal. A plug 23 closes an electrolyte fill opening 25 in lid 18.

The cell 10 includes a cathode of a twin cathode plate structure comprising two cathode plates 26A and 26B joined together by an intermediate connector 28. The cathode plates 26A and 26B comprise cathode active bodies contacted to two cathode current collector portions (not shown) joined by the intermediate conductor portion 28. In the drawing, there is illustrated a cell stack assembly comprising a plurality of these cathode structures. A manifold 30 is connected to each of the intermediate conductors 28. By way of example, the cathode current collectors may be in the form of a thin sheet of metal foil (imperforated) or screen (2% to 90% open area), for example of titanium, stainless steel, tantalum, platinum, gold, aluminum, cobalt nickel alloys, nickel-containing alloys, highly alloyed ferritic stainless steel containing molybdenum and chromium, and nickel-, chromium- and molybdenum-containing alloys. The conductor 28 is of a similar material, and is in the form of a solid thin tab extending from one cathode current collector screen to the other.

The cathode plates 26A and 26B contain a solid cathode active material that may be of a carbonaceous chemistry or comprise a metal element, a metal oxide, a mixed metal oxide, a metal sulfide, and combinations thereof. The metal oxide, the mixed metal oxide and the metal sulfide are formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIIB, VIIB and VIII of the Periodic table of Elements, which includes the noble metals and/or other oxide and sulfide compounds. A preferred cathode active material is a reaction product of at least silver and vanadium.

One preferred mixed metal oxide is a transition metal oxide having the general formula $SM_xV_2O_y$, wherein SM is a metal selected from Groups IB to VIIB and VIII of the Periodic Table of Elements, with x being from about 0.30 to 2.0 and y being from about 4.5 to 6.0 in the general formula. By way of illustration, and in no way intended to be limiting, one exemplary cathode active material comprises silver vanadium oxide having the general formula $Ag_xV_2O_2O$ in any one of its many phases, i.e., β-phase silver vanadium oxide having in the general formula x=0.35 and y=5.8, γ-phase silver vanadium oxide having in the general formula x=0.80 and y=5.40, and ε-phase silver vanadium oxide having in the general formula x=1.0 and y=5.5, and combinations and mixtures of phases thereof. For a more detailed description of such cathode active materials reference is made to U.S. Pat. Nos. 4,310, 609 and 4,391,729, both to Liang at al., U.S. Pat. No. 5,545, 497 to Takeuchi et al., U.S. Pat. No. 5,695,892 to Leising et al., U.S. Pat. No. 6,221,534 to Takeuchi et al., U.S. Pat. No. 6,413,669 to Takeuchi et al., U.S. Pat. No. 6,558,845 to Leising et al., U.S. Pat. No. 6,566,007 to Takeuchi et al., U.S. Pat. No. 6,685,752 to Leising at al., U.S. Pat. No. 6,696,201 to Leising et al., and U.S. Pat. No. 6,797,017 to Leising et al., which are all assigned to the assignee of the present invention and incorporated herein by reference.

Another preferred composite transition metal oxide cathode active material is copper silver vanadium oxide (CSVO), which is described in U.S. Pat. Nos. 5,472,810 and 5,516,340, both to Takeuchi et. al. Both patents are assigned to the assignee of the present invention and incorporated herein by reference.

Another cathode active material is a carbonaceous compound prepared from carbon and fluorine, which includes graphitic and nongraphitic forms of carbon, such as coke, charcoal or activated carbon. Fluorinated carbon is represented by the formula (CF)$_x$ wherein x varies from about 0.1 to about 1.9 and preferably from about 0.5 to about 1.2, and $(C_2F)_n$, wherein the n refers to the number of monomer units, which can vary widely. U.S. Pat. No. 8,685,568 to Krehl et al. describes a Li/CF$_x$ cell that is useful with eth present invention. The '568 patent is assigned to the assignee of the present invention and incorporated herein by reference. When the active material is a fluorinated carbon, the titanium cathode current collector has a thin layer of graphite/carbon material, iridium, iridium oxide or platinum applied thereto.

Additional cathode active materials include $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, copper vanadium oxide, and mixtures thereof.

Before fabrication into the cathode plates 26A and 26B, the cathode active material is preferably mixed with a binder material such as a powdered fluoro-polymer; more preferably powdered polytetrafluoroethylene (PTFE) or powdered polyvinylidene fluoride (PVF) present at from about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite, or a metallic powder such as powdered nickel, aluminum, titanium and stainless steel. The preferred cathode active mixture thus includes a powdered fluoro-polymer binder present at about 3 weight percent, a conductive diluent present at about 3 weight percent, and about 94 weight percent of the cathode active material.

The anode comprises a continuous elongated element or structure of alkali metal, preferably lithium or lithium alloy, enclosed within a separator material and folded into a plurality of sections interposed between the twin cathode plates 26A, 265, in particular, the anode comprises an elongated continuous ribbon like anode current collector (not shown) in the form of a thin metal screen, for example of nickel. The anode current collector includes two tabs 32A and 32B extending from opposite side edges thereof. The anode further comprises a pair of elongated ribbon-like lithium sheets pressed together against opposite sides of the anode current collector. These lithium sheets are substantially equal to the width and length of the anode current collector with the result that the anode is of a sandwich-like construction. The anode is enclosed or wrapped in an envelope of separator material (not shown), for example of polypropylene or polyethylene, and folded at spaced intervals along its length to form a serpentine-like structure that receives the plurality of twin plate cathode structures 26A, 26B between the folds to form the cell stack assembly.

As particularly shown in FIG. 1, the anode is folded at spaced intervals to provide anode plates 34A, 34B, 34C, 34D, 34E, 34F and 34G along the length thereof. Three sets of the twin cathode plates 26A, 26B described above are received between adjacent anode plates to form the cell stack assembly that is received in the cell casing 12. While three sets of the twin cathode plates 26A, 26B are shown, it is understood that any number, of plate structures may be utilized in the cell stack depending on the cell requirements. Of course, if more or less than three sets of twin cathode plates 26A, 26B are used, the anode plates are adjusted accordingly.

The terminal pin 20 extending through the glass-to-metal seal and electrically isolated from the casing 12 is formed into a bend such that its proximal end snugly fits into one end of a coupling sleeve secured by welding to an intermediate lead 36. The intermediate lead 36 is, in turn, connected to the manifold 30 such as by welding. An alternate connection for the terminal pin. 20 to the cathode current collector is shown in U.S. Pat. No. 5,750,286 to Paulot et al. The '286 patent is assigned to the assignee of the present invention and incorporated herein by reference.

A cell stack insulator 38 in the form of a thin plate of a polymeric material rests on top of the upper edges of the cathode plates and the serpentine anode. The insulator 38 is provided with slots that receive the cathode connectors 28 and the anode tabs 32A and 323 as it is slipped onto the cell stack in an orientation perpendicular to the plane of the drawing. Insulator is provided to prevent internal electrical short circuits, and by way of example, can be of the thermoplastic fluoropolymers HALAR® or TEFZEL®.

A shield element 40 is positioned adjacent to and in contact with the inner surface of lid 24. This shield 40 is in the form of a thin plate-like strip, elongated rectangularly, and of a size and configuration to cover the inner surface of lid 18. Shield 40 is provided with openings to accommodate the glass-to-metal seal. A second, similarly sized shield element 42 is positioned adjacent to and in contact with shield 40. The shields 40 and 42 protect the internal components of the cell 10 including the electrolyte within casing 12 from heat during welding of lid 18 to casing 12 and welding of the fill plug 23 into the electrolyte fill opening 25 in the lid 18. By way of example, shield 40 is of stainless steel and shield 42 is of mica.

While the present invention has been described with the anode and cathode in the form of alternating plates, such is by way of example only. The cell stack may also comprise the cathode in the form of a strip wound with a corresponding strip of anode material in a structure similar to a "jellyroll", or be of a multi late construction with plate anodes.

In order to prevent internal short circuit conditions, the cathode is separated from the anode by a suitable separator 43. At least one of the anode and cathode is enveloped in the separator 43. For redundancy, both the anode and cathode are enveloped in their own separator.

The separator 43 is of electrically insulative material, and also is chemically unreactive with the anode and cathode active materials, and both chemically unreactive with and insoluble in the electrolyte. In addition, the separator material has a degree of porosity sufficient to allow flow there through of the electrolyte during electrochemical reactions of the cell. Illustrative separator materials include fabrics woven from fluoropolymeric fibers including polyvinylidene fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX® (Chemplast. Inc.), a polypropylene membrane commercially available under the designation CELGARD® (Celanese Plastic Company, Inc.), a paper membrane commercially available under the designation DEXIGLAS (C. H. Dexter, Div., Dexter Corp.), and a polymeric membrane commercially available from Tonen Chemical Corp. under the designation TONEN.

The electrochemical cell 10 further includes a nonaqueous, ionically conductive electrolyte that serves as a medium for migration of ions between the anode and the cathode during electrochemical reactions of the cell. A suitable electrolyte has an inorganic, ionically conductive salt dissolved in a nonaqueous solvent, and more preferably, an ionizable lithium salt dissolved in a mixture of aprotic organic solvents comprising a low viscosity solvent and a high permittivity solvent. The salt serves as the vehicle for migration of the anode ions to intercalate or react with the cathode active materials. Suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LIC_6F_5SO_3$, $LiO_2CCF_3$, $LiSO_6F$, $LiB(C_6H_5)_4$, $LiCF_3SO_3$, and mixtures thereof.

Useful low viscosity solvents include esters, linear and cyclic ethers and dialkyl carbonates such as tetrahydrofuran, methyl acetate, diglyme, trigyime, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof. Suitable high permittivity solvents include cyclic carbonates, cyclic esters, cyclic amides and a sulfoxide such as propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof. In the present invention, the preferred anode active material is lithium metal, the preferred cathode active material is SVO and the preferred electrolyte is 0.8M to 1.5M $LiAsF_6$ or $LiPF_6$ dissolved in a 50:50 mixture, by volume, of propylene carbonate and 1,2-dimethoxyethane.

The metallic casing may comprise materials such as stainless steel, mild steel, nickel-plated mild steel, titanium, tantalum or aluminum, but not limited thereto, so long as the metallic material is compatible for use with components of the cell. The glass used in the glass-to-metal seal is of a corrosion resistant type having up to about 50% by weight silicon such as CABAL 12, TA 23, FUSITE 425 or FUSITE 435. The positive terminal pin 20 preferably comprises titanium although molybdenum, aluminum, nickel alloy, or stainless steel can also be used. The cell lid 18 is typically of a material similar to that of the casing. The cell is thereafter filled with the electrolyte solution described hereinabove and hermetically sealed such as by close-welding a stainless steel ball 23 over or into the fill hole 25, but not limited thereto.

Criteria have been established which define a critical lithium cluster as one that is large enough to bridge a gap between a negative polarity portion, such as any part of the casing sidewalls 14, 16 or anode leads 32A, 325, and a positive polarity portion, such as the cathode lead structure comprising the current collector conductors 28, manifold 30, intermediate lead 36 and terminal pin 30. In representative Li/SVO cell designs commercially available from Greatbatch, Inc., Clarence, N.Y., the cathode terminal lead 20 is centered over the cell stack leaving from about 0.140 to about 0.150 inches from the case walls 14, 16 to the lead 20. In some instances, the cathode collector conductors 28 are as close as about 0.05 to about 0.112 inches from the case wall. The orientation and location of a critical cluster must also be defined. A critical cluster must be located in the region of the cell where the case wall and the cathode lead are nearest in proximity and must be oriented perpendicularly to the case wall 14. All three criteria, size, location and orientation must be met in order for a cluster to be classified as critical.

In FIG. 1, distance "x" is the nominal gap between the positive manifold 30 and the negative leads 32A and 32B. In some cell designs, an insulator (not shown) covers the intermediate conductor portions 28 and the manifold 30. However, some portion of the intermediate lead 36 can still be left exposed. In that case, the critical gap distance "y" is between this positive lead 36 and the negative leads 32A and 32B or the casing sidewalls 14, 16. As previously discussed, in the exemplary Li/SVO cell the nominal distance between the positive lead 36 and the casing sidewalls 14, 16 can be as close as 0.112 inches.

FIG. 1 illustrates the cell 10 after having been pulse discharged a sufficient number of times to form lithium clusters and dendrites. Lithium clusters 44A have a length and orientation that is sufficient to bridge from the cathode manifold 30 to anode lead 32A. As previously discussed, clusters 44A can result in an internal loading or short circuit mechanism that prematurely discharges the cell 10. Lithium dendrite 44B, which is not large enough to form a cluster, is illustrated as extending from manifold 44B toward anode lead 32B while dendrite 440 extends from cathode conductor portion 28 toward anode lead 32A. Dendrites 44B and 44C are either not long enough to form a cluster or not oriented in a direction so that they bride over to an internal anode structure. As drawn, dendrites 443, 440 will not present an internal loading or short circuit condition.

Figure 2:
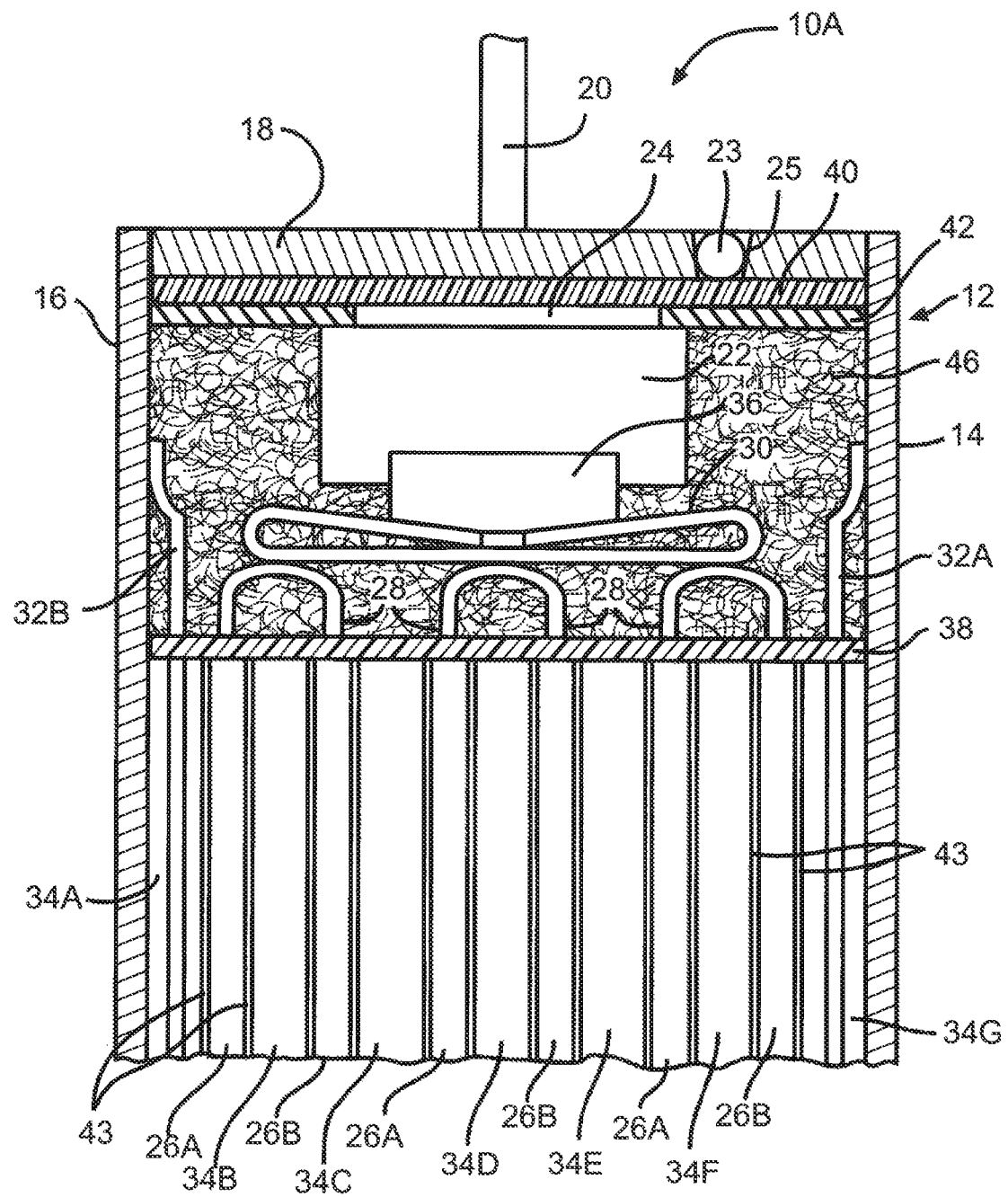
FIG. 2 is a partial sectional view of an exemplary electrochemical cell 10A according to the present invention, which is similar to the cell 10 illustrated in FIG. 1, but which has been provided with a glass wool material 46 to help in preventing lithium dendrite formation.

FIG. 2 illustrates an exemplary electrochemical cell 10A similar to the cell 10 shown in FIG. 1. But for the provision of a glass wool material 46, cell. 10A has been pulse discharged a sufficient number of times to form bridging lithium clusters. The glass wool material 46 is loosely packed outside the separator envelope 43 and into the area between the negative polarity cell portions of the casing sidewalls 14, 16 and anode leads 32A, 32B, and the positive polarity portions of the cathode lead structure comprising the current collector conductors 28, manifold 30, intermediate lead 36 and terminal pin 20.

The glass wool material 46 serves several functions. First, sufficient free electrolyte necessary for normal cell function is held in the relatively large pore volume throughout the extent of the glass wool material 46. This limits pooling of excess electrolyte in any one location above the electrode stack. Secondly, the permeability within the glass wool material 46 is tortuous, which effectively increases the distance between the negative and positive surfaces of the anode and cathode. This tortuosity effectively stops the "straight line" lithium deposition growth illustrated as clusters 44A between opposite polarity structures inside the cell casing. While some amount of lithium deposition may still occur, the dendrites are randomly dispersed within the labyrinth of the loosely packed glass wool 46, which significantly degrades the ability of dendrites to grow large enough to form a cluster bridging from a structure of negative polarity to one of positive polarity.

Tests were run to determine the permeability of the glass wool material 46 provided in the cell 10A. However, it was determined that the permeability is below the range that is sufficient for a Gurley air flow permeability measurement to be recorded. It was noted that the air flow meter (Gurley) passed 10 ml of air through the sample almost instantaneously. In an attempt to get an acceptable reading, the flow area was decreased to a $0.1 \text{ in}^2$ fixture as opposed to the standard $1 \text{ in}^2$ fixture with the glass wool material being repeatedly folded into a thicker overall sample. However, the permeability readings were outside the range in which a reliable measurement could be taken. It was consequently determined that the glass wool material has a high level of permeability.

While the preferred form of the cells 10, 10A is a case-negative design, the cells can also be constructed in a case-positive configuration. In that configuration, the cathode active material is contacted to the casing by any one of a number of techniques including pressing a powdered mixture of the cathode active mixture to the inner surface of the sidewalls. Other means include forming a freestanding sheet of the cathode active mixture as described in U.S. Pat. Nos. 5,435,874 and 5,571,640, both to Takeuchi et al. The freestanding sheet is then press contacted to the inner surface of the casing sidewalls 14, 16. A thermal spay deposited technique as described in U.S. Pat. No. 5,716,422 to Muffoletto et al. can also be used to provide the requisite electrode active material. These patents are assigned to the assignee of the present invention and incorporated herein by reference. In either the jellyroll or prismatic electrode assembly, there is a conductor extending from the casing sidewall or the electrode active material contacted thereto, whether of the anode or the cathode, to the other portions of the same polarity electrode not in direct contact with the casing.

It is appreciated that various modifications to the inventive concepts described herein may be apparent to those skilled in the art without departing from the spirit and scope of the present invention as defined by the hereinafter appended claims.

What is claimed is:

1. An electrochemical cell, which comprises:
 a) a casing comprising:
  i) a container having a sidewall extending to an opening; and
  ii) a lid configured to close the opening;
 b) an anode positioned inside the casing and comprising lithium supported on an anode current collector connected to the casing;

c) a cathode of a cathode active material selected from the group consisting of silver vanadium oxide, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, $CF_x$, copper oxide, copper vanadium oxide, and mixtures thereof, wherein the cathode active material is supported on a cathode current collector connected to a positive terminal pin extending through an opening in the casing, and wherein the positive terminal pin is electrically insulated from the casing;

d) at least one separator enveloping one of the anode and the cathode, wherein the separator prevents direct physical contact of the anode with the cathode;

e) an electrolyte activating the anode and the cathode; and f) a glass wool material provided at an intermediate location between the casing and anode current collector of a negative polarity and the cathode current collector and the positive terminal pin being of a positive polarity.

2. The electrochemical cell of claim 1 wherein the glass wool material resides outside the separator.

3. The electrochemical cell of claim 1 being dischargeable without lithium precipitating from the electrolyte in an amount sufficient to bridge a nominal distance of about 0.05 inches to about 0.15 inches between a negative polarity terminal comprising the anode current collector connected to the casing and positive polarity portions comprising the cathode current collector and the terminal pin.

4. The electrochemical cell of claim 1 wherein the cathode current collector comprises at least two cathode current collector conductor portions connected to a manifold and an intermediate lead.

5. The electrochemical cell of claim 1 wherein the cell is dischargeable to deliver a pulse electrical current of a greater amplitude than that of a pre-pulse current or open circuit voltage immediately prior to the pulse.

6. The electrochemical cell of claim 1 wherein the cell is dischargeable to deliver a pulse train of one to four 5 to 20-second pulses of about 15 mA/cm$^2$ to about 50 mA/cm$^2$ with about a 2 to 30 second rest between each pulse.

7. The electrochemical cell of claim 1 wherein the anode is provided in a serpentine configuration with the cathode comprising cathode plates positioned between folds of a wind.

8. The electrochemical cell of claim 7 wherein there is a plurality of cathode plates having their current collectors connected to a manifold connected to the positive terminal pin.

9. An electrochemical cell, which comprises:
a) a casing comprising:
  i) a container having a sidewall extending to an opening; and
  ii) a lid configured to close the opening;
b) an anode positioned inside the casing and comprising lithium supported on an anode current collector;
c) a cathode of silver vanadium oxide supported on a cathode current collector, wherein one of the anode current collector and the cathode current collector is connected to the casing serving as the respective negative or positive polarity terminal and the other of the anode current collector and the cathode current collector is connected to a terminal pin extending through an opening in the casing and wherein the terminal pin is electrically insulated from the casing;
d) at least one separator enveloping one of the anode and the cathode, wherein the separator prevents direct physical contact of the anode with the cathode;
e) an electrolyte activating the anode and the cathode; and f) a glass wool material provided at an intermediate location between the anode and the cathode.

10. The electrochemical cell of claim 9 wherein the glass wool material resides outside the separator.

11. The electrochemical cell of claim 9 being dischargeable without lithium precipitating from the electrolyte in an amount sufficient to bridge a nominal distance of about 0.05 inches to about 0.15 inches between a negative polarity terminal comprising the anode current collector connected to the casing and positive polarity portions comprising the cathode current collector and the terminal pin.

12. The electrochemical cell of claim 9 wherein the positive polarity portions comprises a plurality of cathode current collectors, at least two cathode current collector conductors connected to a manifold.

13. The electrochemical cell of claim 9 wherein the cell is dischargeable to deliver a pulse train of one to four 5 to 20-second pulses of about 15 mA/cm$^2$ to about 50 mA/cm$^2$ with about a 2 to 30 second rest between each pulse.

14. A method for providing an electrochemical cell, comprising the steps of:
a) providing a casing comprising a container having a sidewall extending to an opening;
b) positioning an anode inside the container, the anode comprising lithium supported on an anode current collector and connecting the anode to the container serving as the negative polarity terminal;
c) positioning a cathode inside the casing, the cathode comprising a cathode active material selected from the group consisting of silver vanadium oxide, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, $CF_x$, copper oxide, copper vanadium oxide, and mixtures thereof, wherein the cathode active material is supported on a cathode current collector and connecting the cathode to a positive terminal pin extending through an opening in the casing, wherein the positive terminal pin is electrically insulated from the casing;
d) enveloping at least one of the anode and the cathode in a separator, thereby preventing direct physical contact of the anode with the cathode;
e) positioning a glass wool material at an intermediate location between the casing and anode current collector of a negative polarity and the cathode current collector and the positive terminal pin being of a positive polarity; and
f) closing the container with a lid and activating the anode and the cathode with an electrolyte.

15. The method of claim 14 including discharging the cell without lithium precipitating from the electrolyte in an amount sufficient to bridge a nominal distance between a negative polarity terminal comprising the anode current collector connected to the casing and the positive cell portions comprising the cathode current collector and the terminal pin.

16. The method of claim 14 including providing the glass wool material residing outside the separator.

17. The method of claim 14 including discharging the cell to deliver a pulse train of one to four 5 to 20-second pulses of about 15 mA/cm$^2$ to about 50 mA/cm$^2$ with about a 2 to 30 second rest between each pulse.

18. The method of claim 14 including extending the positive terminal pin through an opening in the lid.

* * * * *